United States Patent [19]

Steiner

[11] Patent Number: 4,521,138
[45] Date of Patent: Jun. 4, 1985

[54] BUILDING BLOCKS

[75] Inventor: Alfred Steiner, Andelfingen, Switzerland

[73] Assignee: Steiner Silidur AG, Andelfingen, Switzerland

[21] Appl. No.: 416,206

[22] Filed: Sep. 9, 1982

Related U.S. Application Data

[62] Division of Ser. No. 208,217, Nov. 19, 1980, Pat. No. 4,379,659.

[30] Foreign Application Priority Data

Sep. 5, 1980 [CH] Switzerland .............. 6698/80
Sep. 5, 1980 [CH] Switzerland .............. 6699/80

[51] Int. Cl.³ .............. E02D 29/02; E04C 2/04
[52] U.S. Cl. .............. 405/284; 405/286; 52/608; D25/80
[58] Field of Search .............. 405/15, 284–286; 47/33, 47, 83, 86; 256/19; D25/80, 87, 88, 89, 91, 92, 94; 52/169.4, 439, 596, 608

[56] References Cited

U.S. PATENT DOCUMENTS

| D. 217,244 | 4/1970 | Fairfield | D25/80 |
| D. 230,846 | 3/1974 | Friederich | D25/80 |
| D. 264,996 | 6/1982 | Siedschlag | D25/80 X |
| 379,338 | 3/1888 | Steinau | 52/608 |
| 2,737,801 | 4/1956 | Barnhart | D25/80 X |
| 3,073,061 | 1/1963 | Pearson | 47/33 X |
| 3,389,499 | 6/1968 | Haile | 47/33 |
| 4,229,123 | 10/1980 | Heinzmann | 405/286 X |

FOREIGN PATENT DOCUMENTS 386067  9/1973  U.S.S.R. .............. 405/284

Primary Examiner—Cornelius J. Husar
Assistant Examiner—Nancy J. Stodola
Attorney, Agent, or Firm—Benoit Law Corporation

[57] ABSTRACT

A building block for walls which are laid in courses without mortar and can be stabilized by planting, has a base wall, a face wall, and two curved side walls. The base wall has rounded transition sections to the face wall and to the side walls. The block includes at least two curved dividing walls bounding a central space and two outer spaces between the side walls, with the upper edges of the face wall, of the side walls and of the dividing walls lying at least approximately in one plane. The building block is open at a rear thereof opposite the face wall, and the building block has an open top extending in the above mentioned one plane from the open rear to the face wall.

12 Claims, 9 Drawing Figures

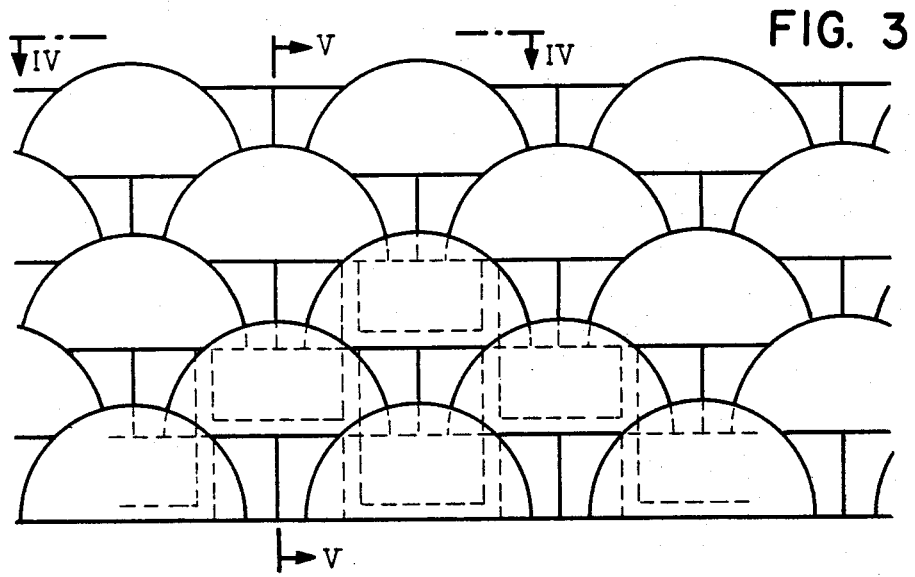
FIG. 3
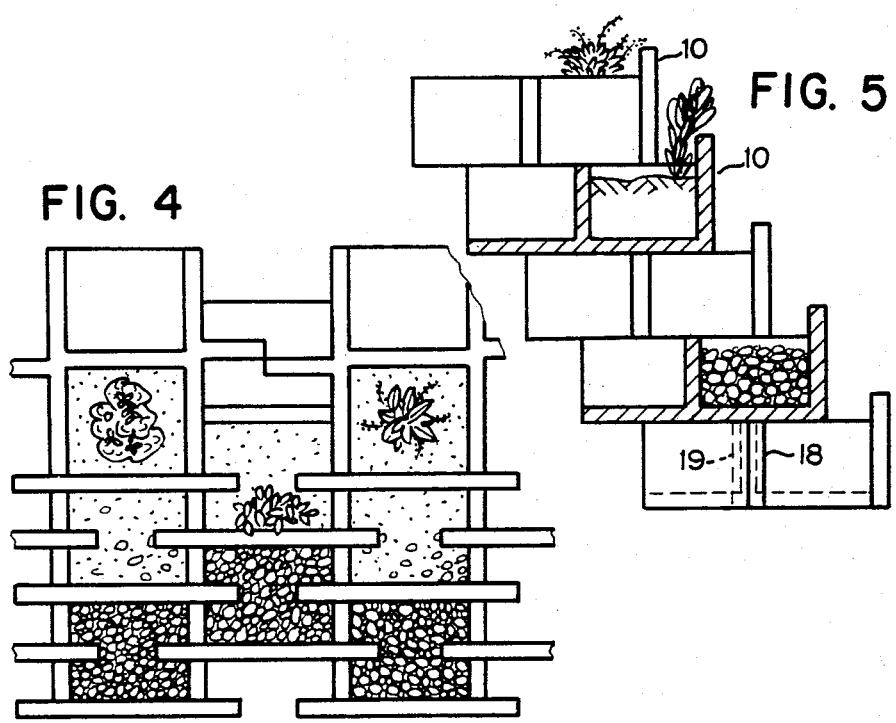
FIG. 4
FIG. 5

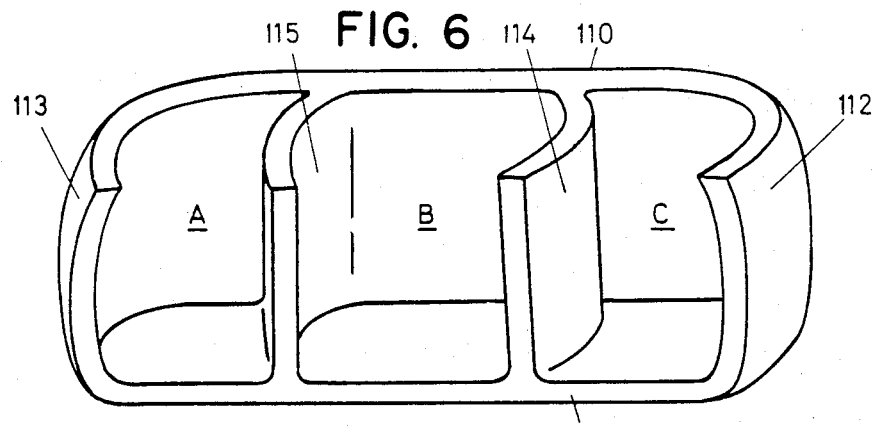
FIG. 6
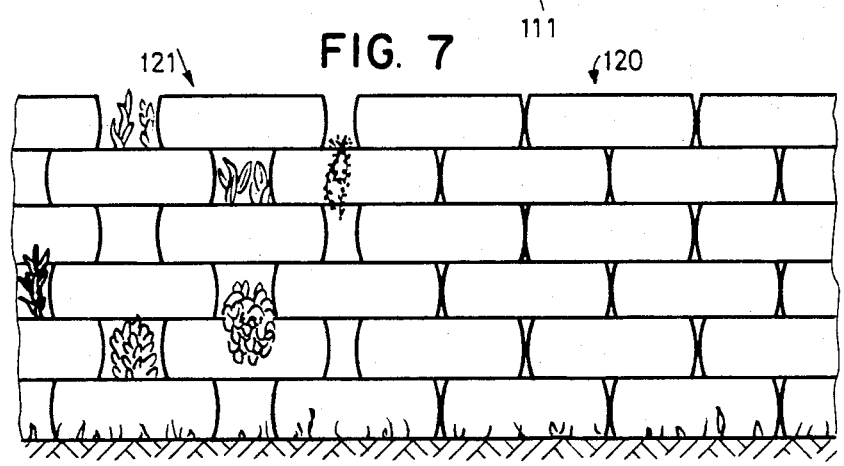
FIG. 7
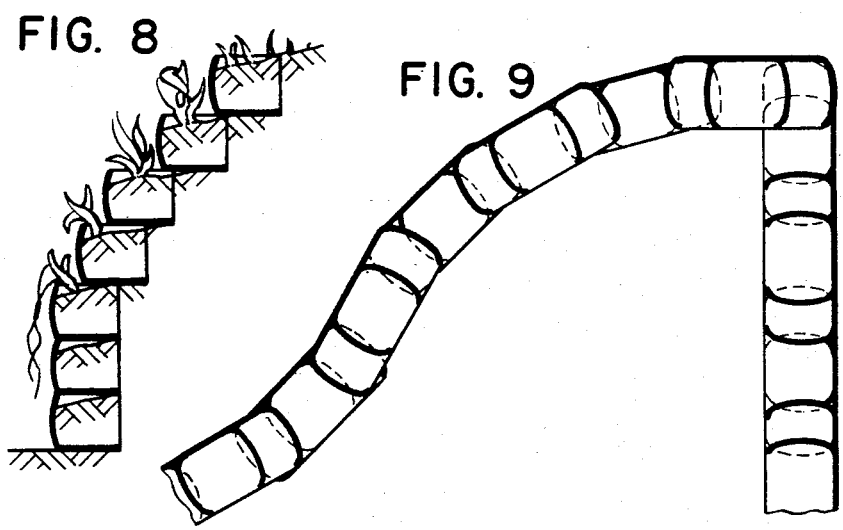
FIG. 8
FIG. 9

BUILDING BLOCKS

This is a division of application Ser. No. 06/208,217, filed Nov. 19, 1980, for Building Blocks (now U.S. Pat. No. 4,379,659).

BACKGROUND OF THE INVENTION

1. Field of the Invention

The present invention relates to building and landscaping materials and, more specifically, to blocks for building walls and to shaped hollow blocks for lining bank slopes.

2. Disclosure Statement Under 37 CFR 1.56(a)

This disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also the following comments contain conclusions and observations which have only been drawn or become apparent after conception of the subject invention or which contrast the subject invention or its merits against the background of developments subsequent in time or priority.

Shaped blocks for building dry walls or walls without mortar, for building retaining walls or revetment walls and for stabilizing slopes as protection against erosion damage or slides are known. Such shaped blocks are frequently laid in courses in an open form of construction, so that the intervening spaces, resembling the berms in terraced lining, can be grassed over. In this direction, a new approach was marked by a bank block according to German Patent Publication No. 25 37 408.

This shaped block is a box-shaped precast concrete block, open towards the rear and having a front wall, two side walls and a base. The two side walls are extended, by a small amount, to below the base, so that channels are formed in the base, on both sides, such that shaped blocks laid in courses engage into each other by means of an indentation produced thereby. In this way, a type of gravity wall is produced, having the dead weight of the blocks and the weight of the earth material, filled into the void space, as weight per unit area.

In the case of the shaped blocks described, disadvantages result from the indentation, due, on the one hand, to a high weight of the blocks, of about 50 kilograms (kg): this high weight resulting from the dimensions between the channels, such dimensions being necessary for convex or concave wall curvatures, and, on the other hand, to the requirement for a large number of shaped blocks per unit area of wall. Thus, for example, eight blocks are required per square meter ($m^2$) of wall and a steepest wall slope of 3:1 and a smallest radius of curvature of approximately 2 meters (m) can, respectively, be achieved.

It has become evident that, for many cases, particularly in the case of terracing the ground surrounding detached houses, where slopes of 1 m to 2 m at the most are to be reinforced, these known shaped blocks were too expensive and, moreover, insufficiently versatile for many applications.

Also, slope blocks of that type cannot be used well for lining bank slopes in the region of the ground water level, because they cannot anywhere form a closure against the undisturbed earth or against dumped earth or fill.

Experiments and tests were also carried out with a thickened base, to increase the weight, without depressions in the base for forming sealing interlocks between side walls and base, and additionally, with a transverse wall parallel to the face wall and with external wing-like side interlocks on the side walls. Compared to conventional lining using naturally broken stone, slope blocks of this type are, of course, significantly more expensive; they can, however, be grassed over from the water line in a simple manner, whilst below the water line the depressions can be filled with large pebbles in order thereby to increase the weight of the slope blocks. Experience, however, has shown that all these above measures together do not suffice to give the natural appearance to a watercourse having curved and straight places, because adequate closure against the earth is not ensured when the blocks are laid in courses on each other at an angle, and there is accordingly a danger of washout.

SUMMARY OF THE INVENTION

It is a general object of this invention to overcome the disadvantages and satisfy the needs expressed or implicit in the above disclosure statement or in other parts hereof.

It is a germane object of this invention to provide improved walls and to stabilize slopes.

It is a related object of this invention to provide improved building blocks.

It is also an object of this invention to produce shaped blocks of the type described, which are lighter and accordingly cheaper to manufacture and with which any shape of wall is rendered possible, from a vertical wall to a wall having a minimum slope of approximately 2:1 and having appropriate back-filling with earth, and from right-angle corners to an extended wall course having any desired wall curvature.

A related object of this invention is to produce shaped hollow blocks capable of satisfying all requirements relevant to the lining of bank slopes.

The subject invention resides in a building block for walls which are laid in course without mortar and can be stabilized by planting, comprising, in combination, a face wall, two side walls, a base wall having rounded transition sections to the face wall and to the side walls, and at least two additional dividing walls bounding a central space and two outer spaces between the side walls, with the upper edges of the face wall, of the side walls and of the dividing walls lying at least approximately in one plane.

BRIEF DESCRIPTION OF THE DRAWINGS

The subject invention and its various objects and aspects will become more readily apparent from the following detailed description of preferred embodiments thereof, illustrated by way of example in the accompanying drawings, in which:

FIGS. 3, 4 and 5 are an elevation, a plan view, and a cross-section, respectively, of a bank slope reinforced with shaped hollow blocks according to an embodiment of the invention disclosed and claimed in the parent U.S. Pat. No. 4,379,659;

FIG. 6 is a perspective view of a shell building block according to a preferred embodiment of the subject invention;

FIG. 7 is an elevation of a wall built, without mortar, from shell building blocks according to FIG. 6;

FIG. 8 is a cross-section through a retaining wall made from shell building blocks according to FIG. 6, for stabilizing a slope; and FIG. 9 is a plan view of a retaining wall made from shell building blocks according to FIG. 6 and illustrates the execution of any desired wall curvature.

DESCRIPTION OF PREFERRED EMBODIMENTS

Figure 1:
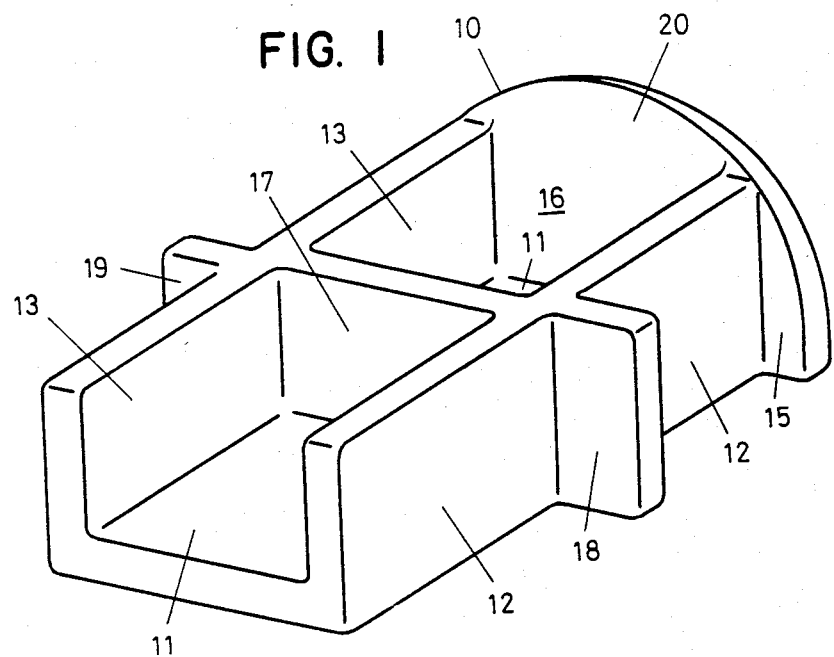
FIG. 1 is a perspective view of a shaped hollow block according to a first embodiment of the invention disclosed and claimed in the parent U.S. Pat. No. 4,379,659.

The two embodiments of the shaped hollow block, according to the invention disclosed and claimed in the parent U.S. Pat. No. 4,379,659 and shown in FIGS. 1 and 2, each have a face wall 10 and, connecting therewith, a base wall 1 and two side walls 12 and 13. The face wall 10 is designed, preferably as a plate of semicircular shape, in the form of a shield, which stands perpendicularly to the base wall 11, has on both sides a margin 15 projecting relative to the outside surface of the side walls 12 and 13, and has a height 20 greater than that of the side walls; projecting above the upper edges of the above mentioned side walls 12 and 13.

Figure 2:
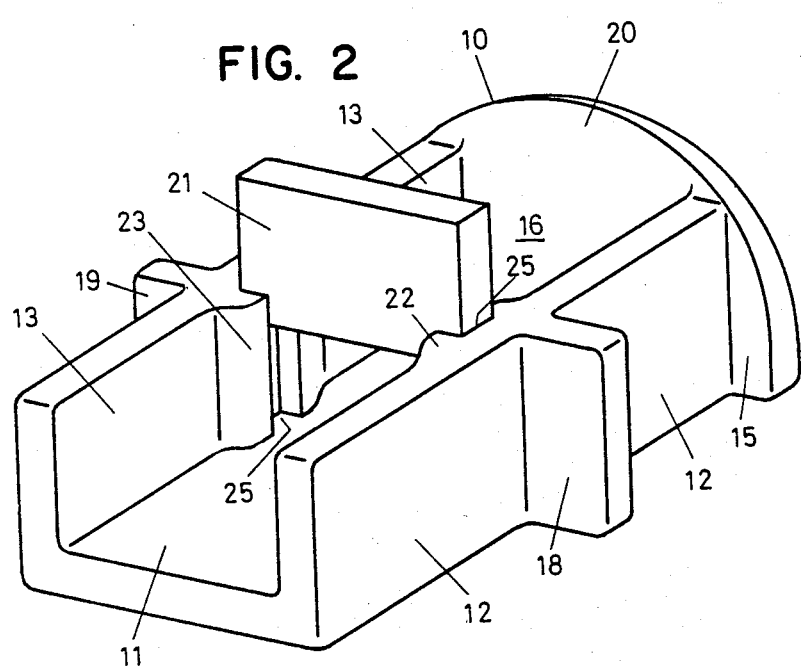
FIG. 2 is a perspective view of a shaped hollow block according to a second embodiment of the invention disclosed and claimed in the parent U.S. Pat. No. 4,379,659.

The elongate trough 16, formed jointly by the side walls 12 and 13 and the base wall 11 in a direction normal to the face wall 10, is subdivided into two approximately equal parts by means of a transverse wall 17 (FIG. 1). The shaped block thus includes two compartments separated by the transverse wall 17 extending parallel to the face wall 10 in the trough. In the region of the transverse wall 17, the side walls carry, on their outer surfaces, two reinforcing walls 18 and 19, projecting outwardly from the side walls and being preferably moulded-on integrally with the side walls. The reinforcing walls 18 and 19 preferably project from the side walls or are arranged with a displacement relative to each other, such that adjacent reinforcing walls 18 and 19 engage behind each other or interlock when several shaped hollow blocks are laid in courses on or are positioned adjacent each other.

Each margin 15 which projects at the face surface 10 preferably is smaller than the corresponding lateral extension of the reinforcing walls 18 and 19. The reinforcing walls 18 and 19, measured outwards of the side walls, are larger than the width of the projecting margins 15 of the face wall 10.

The projecting margins 15 and the reinforcing walls 18 and 19 have several purposes. For instance, if in the case of a slope extending rearwards, the shaped hollow blocks are laid with their face walls in lateral contact or alignment with each other, chambers are formed, on the one hand, by the troughs 16 and, on the other hand, by the side walls 12 and 13 and the reinforcing walls 18 and 19 which engage behind each other or interlock; applied water being trapped in these chambers and the earth behind the shaped hollow blocks being unable to wash out. In the case of concave curvatures, the face walls 10 can remain adjacent to each other and the reinforcing walls 18 and 19 may in effect be pulled apart until they are just touching each other. On the other hand, in the case of convex curvature, the face walls 10 can be pulled apart and the reinforcing walls 18 and 19 remain engaged with each other.

In addition to the above, the projecting margins, 15, together with the reinforcing walls 18 and 19, enable the blocks to be laid loosely and thus enable the cost of the slope stabilization to be reduced.

FIGS. 3, 4 and 5 show a type of layering of loosely laid shaped hollow blocks, in elevation, plan, and in cross-section, respectively.

In the embodiment of FIG. 1, the transverse wall 17 is moulded-on integrally with the side walls. According to the second illustrative embodiment according to FIG. 2, the transverse wall 21 is not formed integrally with the side walls and the base wall, but is manufactured as a separate part, for the retention of which the side walls 12 and 13 possess, inside the trough, enlarged portions 22 and 23 on their inner sides; such enlarged portions defining each a groove 25 standing normal or extending perpendicularly to the base wall 11 for the purpose of retaining the separate part or transverse wall 21. The advantage of such an embodiment is greater versatility.

In practice, the hollow blocks advantageously may be completely filled with earth above the normal water level, and the blocks can be provided with plants, whereby a biological connection with the undisturbed earth is forming within a short time and, despite any flood, no earth washouts are able to occur, inasmuch as the protection from the scouring water is preserved by the margins 15 which project and the greater height 30 of the face wall, on the one hand, and by the reinforcing walls 18 and 19, on the other hand.

The embodiments of the invention shown in the drawings, that is, the shaped hollow blocks, are also suitable for conventional retaining walls. For instance, the long trough part with the reinforcing walls can be employed for a gravity wall, especially when the earth is loose or in cases when the subsoil is very moist. In this respect, the base wall 11 may have a thickness at least equal to that of the side walls. Alternatively and for larger gravity and greater rigidity, the base wall 11 may have a thickness at least twice as great as that of the side wall.

A preferred embodiment of the subject invention will now be described with the aid of FIGS. 6 to 9.

In the showing of FIG. 6, a shell building block 100 is represented as seen from an open back side or rear. The shell building block 100 comprises a face wall 110, a solid base wall 111, two side walls 112 and 113 and at least two dividing walls 114 and 115 bounding a central space B and two outer spaces A and C between the side walls 112 and 113. The base wall 111 has rounded transition sections to the face wall 110 and to the side walls 112 and 113. Preferably, the face wall 110 and the two side walls 112 and 113 are domed outwardly in a convex manner, and, in particular, in a manner such that they are pulled in above, below and behind, and particularly toward the base wall and toward a top opposite the base wall. As seen in this respect in FIG. 6, each of the two side walls 112 and 113 is curved outwardly along arches extending parallel to the base wall, and arches extending vertically to that base wall 111. The face wall 110 is also domed in a convex manner, being rounded towards the rear at the upper edge and at the lower edge. The transition sections between the base wall 111 and the side walls 112 and 113, between the base wall 111 and the face wall 110, and between the face wall 110 and the side walls 112 and 113 are rounded. The side walls 112 and 113 exhibit a rounding towards the rear opposite the face wall. Such rounding of the side walls at least approximately follows a uniform curved line, which may be a segment of a conic section.

The void space between or within the four walls just described is subdivided by the two dividing walls 114 and 115 into the three spaces A, B, C. The dividing walls 114 and 115 extend symmetrically with reference to a median plane of the face wall; this median plane standing normal to the base wall.

Each of, the dividing walls 114 and 115 is curved, concave to the outside, and stand at least approximately normally on the base wall, such that the central space B has its greatest dimension in a central region thereof.

The walls 114 and 115 can be regarded as sections of the curved surface of a perpendicular or right cylinder having a conic section as a base line.

The upper edges of the face wall 110, of the side walls 112 and 113 and of the dividing walls 114 and 115 lie at least approximately in a common plane. In other words, as seen in FIG. 6, the face wall 110, side walls 112, 113 and dividing walls 114, 115 have upper edges lying at least approximately in one plane extending throughout the upper edges of the face wall 110, side walls 112, 113 and dividing walls 114, 115. As also seen in FIG. 6, the building block 110 is open at a rear thereof opposite the face wall 110, and the building block has an open top extending in the latter one plane from the open rear just mentioned to the face wall 110. When shell building blocks of this type are being laid in courses, this arrangement allows free choice of a gap between adjacent shell building blocks, in such a way that the upper building block always rests in contact with, in each case, a side wall 112 or 113 and, in the same way, with the corresponding dividing wall 114 or 115. As seen in FIG. 6, each dividing wall 114, 115 has a height extending from the base wall 111 to the above mentioned one plane at the open top, and a depth extending from the face wall 110 to the open rear. As also seen in FIG. 6, all sides of the dividing walls 114, 115 extend uninterruptedly from the solid base wall 111 in parallel to and for the full extent of said height to said one plane at the open top, and such dividing walls 114, 115 extend for their entire depths along said one plane at the open top from the face wall 110 to the open rear of the building block.

As FIG. 7 shows, walls can be laid in courses, without mortar, in a closed form of construction 120, as shown on the right in FIG. 7, or in an open form of construction 121, as shown on the left in FIG. 7. In the case of an open laying in courses, the intervening spaces between two adjacent shell building blocks can be grassed over or planted in a known manner.

The vertical laying in courses, shown in FIGS. 8 and 9, which can merge into a more gentle slope adapted to the site configuration, and the virtually unrestricted variation of the wall curvatures between walls of extended form and right-angle form, are new and advantageous features of these proposed shell building blocks.

However, high walls should not be built up with such a shell building block, because the static strength is lacking. In the case of a length of 50 centimeters (cm), a height of 20 cm and a depth of 25 cm, the shell building block, made of concrete or normal quality, possesses a weight of about 35 kg. However, walls of up to 1.5 m may also be erected with these proposed shell building blocks, depending on the bank angle. After some time, usually 1 to 2 years, the plant roots have penetrated so far into the undisturbed soil of the slope that the wall can usually be regarded as a unit belonging to the soil. No special arrangements need be made for the slope drainage, because sufficient gaps and cracks are present, both in the closed form of construction and in the open form of construction, for the slope water to flow off easily, even under heavy rain, without the slope being eroded.

I claim:

1. A building block for walls which are laid in courses without mortar and can be stabilized by planting, comprising, in combination, a solid base wall, a face wall, and two side walls, said base wall having rounded transition sections to the face wall and to the side walls, and at least two additional dividing walls bounding a central space and two outer spaces between the side walls, said face wall, side walls and dividing walls having upper edges lying at least approximately in one plane extending throughout the upper edges of said face wall, side walls and dividing walls, said building block being open at a rear thereof opposite said face wall, and said building block having an open top extending in said one plane from said open rear to said face wall, each dividing wall having a height extending from said base wall to said one plane and a depth extending from said face wall to said open rear, all sides of said dividing walls extending uninterruptedly from said solid base wall in parallel to and for the full extent of said height to said one plane at said open top, said dividing walls extending for their entire depths along said one plane at said open top from said face wall to said open rear, and each of said dividing walls being curved such that said central space has its greatest dimension in a central region thereof between said face wall and said rear.

2. A building block as claimed in claim 1, wherein each of said two side walls is curved inwardly along arches extending parallel to said base wall, and arches extending vertically to said base wall.

3. A building block as claimed in claim 1 or 2, wherein the dividing walls extend symmetrically with reference to a median plane of the face wall, this median plane standing normal to the base wall.

4. A building block as claimed in claim 3 or, including rounded transitions from the side walls to the face walls, with each side wall having a rounding towards the rear opposite the face wall.

5. A building block as claimed in claim 3, wherein each of the dividing walls represents a section of a curved surface of a right cylinder.

6. A building block for walls which are laid in courses without mortar and can be stabilized by planting, comprising, in combination, a solid base wall, a face wall, and two side walls, said base wall having rounded transition sections to the face wall and to the side walls, and at least two additional dividing walls bounding a central space and two outer spaces between the side walls, said face wall, side walls and dividing walls having upper edges lying at least approximately in one plane extending throughout the upper edges of said face wall, side walls and dividing walls, said building block being open at a rear thereof opposite said face wall, and said building block having an open top extending in said one plane from said open rear to said face wall, each dividing wall having a height extending from said base wall to said one plane and a depth extending from said face wall to said open rear, all sides of said dividing walls extending uninterruptedly from said solid base wall in parallel to and for the full extent of said height to said one plane at said open top, said dividing walls extending for their entire depths along said one plane at said open top from said face wall to said open rear, said dividing walls extending symmetrically with reference to a median plane of the face wall, this median plane standing normal to the base wall, and said dividing walls having a curvature in plan, such that said central space has its greatest dimension in a central region thereof.

7. A building block as claimed in claim 1, 2 or 5, including rounded transitions from the side walls to the face wall.

8. A building block as claimed in claim 1, 2 or 5, wherein the side walls have a rounding towards the rear opposite the face wall.

9. A building block as claimed in claim 8, wherein the rounding of the side walls at least approximately follows a uniformly curved line.

10. A building block as claimed in claim 9, wherein the curved line is a segment of a conic section.

11. A building block as claimed in claim 6, wherein each of said two side walls is curved inwardly along arches extending parallel to said base wall, and arches extending vertically to said base wall.

12. A building block as claimed in claim 11, wherein each of the dividing walls represents a section of a curved surface of a right cylinder.

* * * * *